US010325626B1

(12) United States Patent
Barnett et al.

(10) Patent No.: US 10,325,626 B1
(45) Date of Patent: *Jun. 18, 2019

(54) METHOD AND COMPUTER PROGRAM PRODUCT FOR BUILDING AND DISPLAYING VIDEOS OF USERS AND FORWARDING COMMUNICATIONS TO MOVE USERS INTO PROXIMITY TO ONE ANOTHER

(71) Applicant: Zoosk, Inc., San Francisco, CA (US)

(72) Inventors: Eric R. Barnett, Menlo Park, CA (US); Anna W. Yen, San Francisco, CA (US); Charmagne Kringstein, San Francisco, CA (US); Dani Y. Li, San Francisco, CA (US); Danielle Chandler, San Francisco, CA (US); James E. Infusino, San Francisco, CA (US)

(73) Assignee: Zoosk, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/905,507

(22) Filed: Feb. 26, 2018

Related U.S. Application Data

(63) Continuation of application No. 15/406,710, filed on Jan. 14, 2017, now Pat. No. 9,905,266.

(60) Provisional application No. 62/279,582, filed on Jan. 15, 2016.

(51) Int. Cl.
*H04N 9/80* (2006.01)
*G11B 27/031* (2006.01)
*G06K 9/00* (2006.01)
*H04L 29/08* (2006.01)

(52) U.S. Cl.
CPC ........ *G11B 27/031* (2013.01); *G06K 9/00677* (2013.01); *H04L 67/306* (2013.01); *H05K 999/99* (2013.01)

(58) Field of Classification Search
None
See application file for complete search history.

(56) References Cited

U.S. PATENT DOCUMENTS

| 6,735,568 | B1* | 5/2004 | Buckwalter | G06Q 30/02 705/319 |
|---|---|---|---|---|
| 7,203,674 | B2* | 4/2007 | Cohen | G06Q 10/02 |
| 2010/0145869 | A1* | 6/2010 | Brown | G06Q 10/10 705/319 |
| 2014/0201126 | A1* | 7/2014 | Zadeh | G06K 9/627 706/52 |
| 2015/0142839 | A1* | 5/2015 | Ochandio | G06Q 50/01 707/758 |
| 2016/0080835 | A1* | 3/2016 | von Sneidern | G11B 27/031 386/282 |

* cited by examiner

*Primary Examiner* — Heather R Jones
(74) *Attorney, Agent, or Firm* — Innovation Partners; Charles E. Gotlieb

(57) ABSTRACT

A system and method allows users to provide, edit and order photos or videos that other users can use to determine interest in that user. If both users indicate interest in one another, communications between such users are enabled.

10 Claims, 3 Drawing Sheets

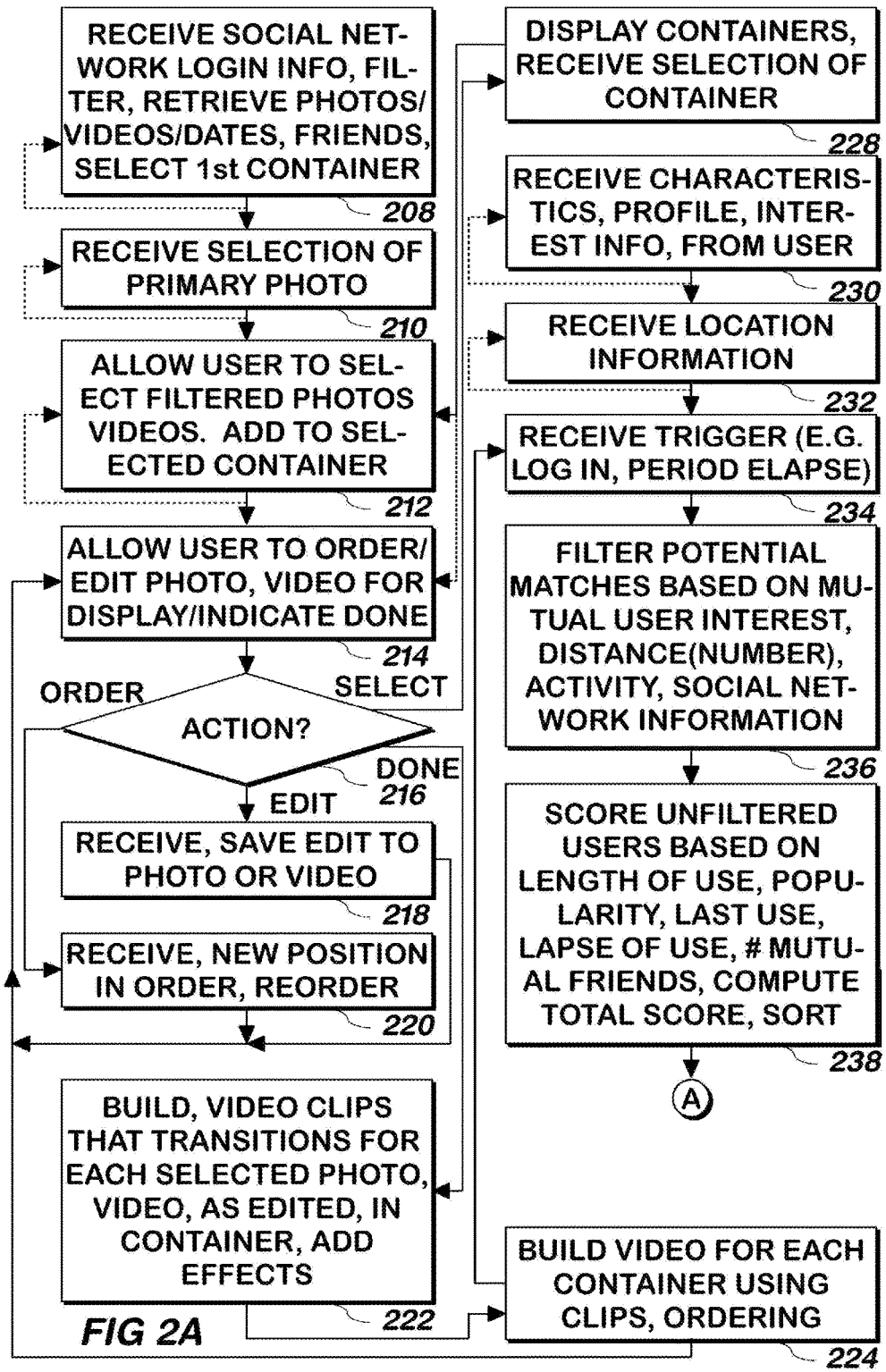

METHOD AND COMPUTER PROGRAM PRODUCT FOR BUILDING AND DISPLAYING VIDEOS OF USERS AND FORWARDING COMMUNICATIONS TO MOVE USERS INTO PROXIMITY TO ONE ANOTHER

RELATED APPLICATIONS

This application is a continuation of U.S. patent application Ser. No. 15/406,710 entitled, "Method and Computer Program Product for Building and Displaying Videos of Users and Forwarding Communications to Move Users Into Proximity to One Another", filed by Anna Wei Yen, Eric R. Barnett, Charmagne Kringstein, Dani Yidan Li, Danielle Chandler and E. James Infusino on Jan. 14, 2017, which claims the benefit of U.S. Provisional patent application Ser. No. 62/279,582 entitled, "Method and Apparatus for Forwarding Communications to Move Users Into Proximity to One Another" filed by Anna Wei Yen, Eric R. Barnett, Charmagne Kringstein, Dani Yidan Li, Danielle Chandler and E. James Infusino on Jan. 15, 2016, each having the same assignee as the present invention and each is hereby incorporated by reference in its entirety.

FIELD OF THE INVENTION

The present invention is related to computer software and hardware and more specifically to computer software and hardware for enabling electronic communications between users to allow them to move into proximity to one another for a further distance.

BACKGROUND OF THE INVENTION

Compatible users may desire to move into proximity to one another via communications between such users. Current systems for enabling such communications are suboptimal. What is needed is a system and method for enabling communications between compatible users to allow them to move into proximity to one another.

SUMMARY OF INVENTION

A system and method produces videos for each of one or more containers for each user by allowing the users to select and edit photos and videos of the user from their social networks and/or smart devices. The user may also select a photo to use as a primary photo from a limited set of photos of the user. Each user may edit the order and content of the photos and videos. Many such users perform these functions, and specify characteristics of themselves, of other users in whom they are interested, and may provide profile information that describes such user.

When a user performs a trigger event, such as by starting an application that allows the user to view videos of other users as described herein, other users are selected, the primary photo for the user is displayed and then the video from a container such as the first container of the other user selected plays in a loop to show the several photos and/or videos from that container. Other users may be selected from among any or all of users who have indicated an interest in that user, other users who may be compatible with the user and still other users randomly selected. The user viewing the video may indicate they are interested or not interested in the other user whose video is being played, may view the profile information of the other user, or may select other available containers of the user, in which case the video for the other container is played for the user. The process may continue until the user indicates they are interested in the other user or not interested in the other user, such interest or lack of interest is recorded for the user and the other user, and another such other user is selected and the video from a container of the newly selected user is automatically played to the user. All videos may play in a looping manner, meaning they repeat over and over again.

If two users both indicate an interest in each other after viewing the respective videos in this manner, communications between such users are enabled and the users may use such communications to move into proximity with one another to convert such users into a proximate pair of users.

DETAILED DESCRIPTION OF A PREFERRED EMBODIMENT

Figure 1:
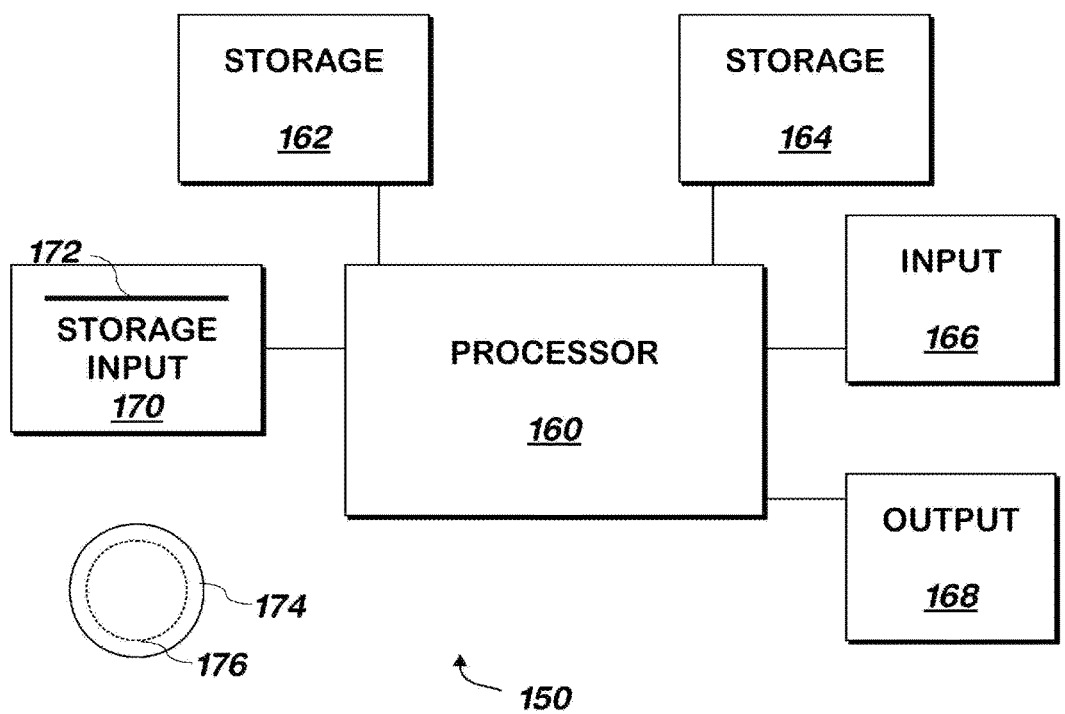
FIG. 1 is a block schematic diagram of a conventional computer system.

The present invention may be implemented as computer software running on a conventional computer system, computer software embodied on a non-transitory storage media, or otherwise. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All elements of a system include any or all of at least one input, at least one output and at least one input/output. System elements may include a conventional processor.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the ORACLE SOLARIS 11 or higher operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, 7 or 8) commercially available from MICROSOFT Corporation of Redmond Wash. or a Macintosh computer system running the OS X operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY S5 commercially available from SAMSUNG ELECTRONICS GLOBAL of Seoul, South Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2B:
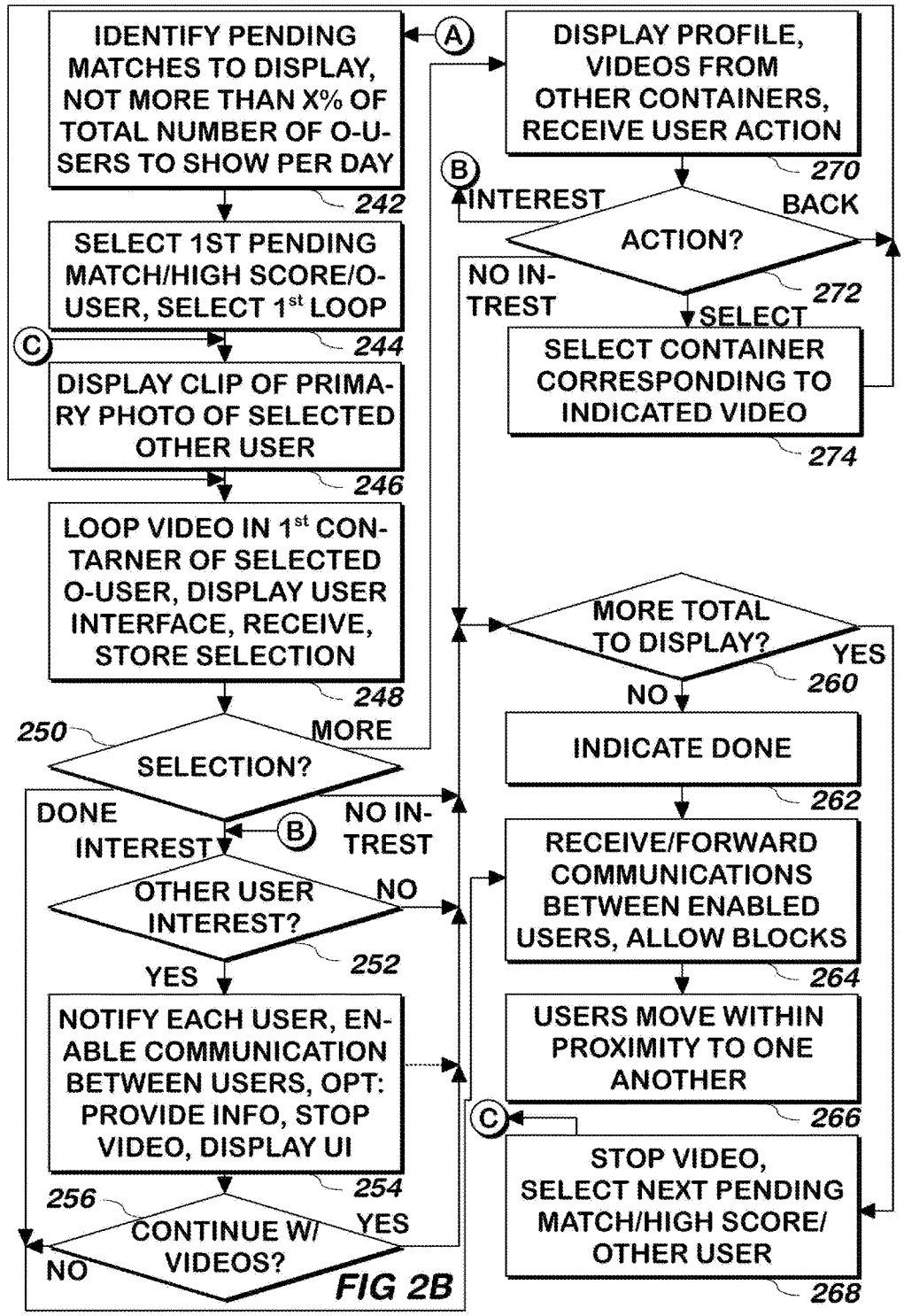
FIG. 2, consisting of FIG. 2A and FIG. 2B, is a flowchart illustrating a method of enabling communications between users according to one embodiment of the present invention.

FIG. 2, consisting of FIGS. 2A and 2B, is a flowchart illustrating a method of forwarding electronic communications between users to cause users to move into proximity with one another thereby transforming the users from separated to a proximate pair according to one embodiment of the present invention. Referring now to FIG. 2, social network login information is received, for example by allowing the user to log in via one or more social networks so that each social network provides a unique identifier that can be used to identify such user, and photographs and videos are retrieved from such social network account or accounts, including those provided by the user and those provided to the social network by other users of the social network that are indicated as containing the user 208. The user's friends or other connections may be retrieved from the social network as part of step 208, and/or a friend relationship between two users may be tested as part of the other steps described below. A first one of multiple containers is selected as part of step 208.

Thumbnails of the retrieved photographs are displayed to the user and the user is allowed to select one of the photographs as a primary photograph for use as described below. The selection is received, the photograph is optionally uploaded to a server from its source and it is stored associated with the user. In one embodiment, the date of receipt by the social network of such photograph is received with each photograph, and the primary photograph may only be selected from among the photographs with the date of receipt less than a threshold amount of time, such as two years. The primary photograph may be referred to as a cover photograph.

The photographs and/or videos, both retrieved from the one or more social networks and those on the user's mobile device that the user uses to cause the method of FIG. 2 to be performed in part are filtered to remove the videos that do not have sufficient quality, such as those under 480×480 resolution, and the user may select some or all of the photographs and videos that pass through the filter for display as described herein 212. In one embodiment, a minimum or maximum number of photographs and/or videos for any container containing at least one photograph and/or videos for any container containing at least one photograph and/or video may be enforced as part of step 212. The selected photographs and/or videos are optionally uploaded from their source or sources to a server and stored associated with the user and the selected container as part of step 212.

Steps 208-212 may each operate as independently running processes as shown by the dashed lines in the figure's to allow the user to retrieve then select videos and photographs at any time.

A user interface is provided to allow the user to order the photos or videos within the selected container for display as described herein, to edit the photos or videos, to select a different container, or indicate that the user is done ordering and editing the videos or selecting containers. The user interface may include thumbnails of the photographs, or the initial image from each video in the selected container, with the user being allowed to drag a thumbnail to indicate a reordering of the photograph or video corresponding to that thumbnail, or to select the thumbnail, indicating that the user wishes to edit the photograph or video, as described below.

An indication of an action the user wishes to perform is received as part of step 214, along with an indication of the photograph or video desired to be reordered or edited, and if the action is to edit a photograph or video 216, a user interface to allow the user to edit the photograph or video is provided to the user, and instructions regarding how to edit the photograph or video are provided to the user. In one embodiment, editing a photograph may include cropping the photograph, and the resulting cropped photograph is automatically expanded to fill the a standard size area. As used herein, 'automatically' means without additional user input. In one embodiment, all photographs and videos added to a container are converted to a standard size so that the area of the displayed photograph is the area after such conversion. In one embodiment, editing a video may include defining a start and end time within the video, such that the resulting video is of a standard length, such as 4 seconds. In one embodiment, a default start and end time are added to the videos retrieved from the social network, for example using a default start time of zero, and a default end time equal to the standard length, so that if the user does not specify a different start and end time, the default values will be used. The edits are saved, associated with the photograph or video as part of step 218. The method continues at step 214.

If the action is to reorder the photograph or video 216, the user selects the photograph or the video to be reordered in the selected container using the user interface, and indicates its new position relative to the other photographs and/or videos in the selected container, for example by dragging the thumbnail of the photograph or video into its new position relative to the thumbnails of the other photographs and/or videos in the selected container 220. In one embodiment, the initial order of the photographs and/or videos is the order in which such photographs and/or videos were selected for the selected container. In one embodiment, if the user wishes to reorder a video to be in the first position, the user interface will not allow such a reordering, as part of step 220. The new order is saved, associated with the selected container as part of step 220. The method continues at step 214.

If the action is to select a different container 216, representations of the containers may be displayed, via a label, one thumbnail of a photo or first image in a video or multiple thumbnails of the photos or first images of the videos or video of the container as described herein, and a user interface is provided to allow the user to select a container, either a different one or the same one as is currently selected, the selection is received 228 and the method continues at step 212 if the selected container is empty, or at step 212 or 214 via a user interface that allows the user to select between the activities of those two actions.

The user may repeat steps 214 through 220 and 228 as many times as desired, and may return to any of steps 210-214 a later time. When the user indicates that the user is done 216, the method continues at step 222.

At step 222, each photograph or video, as edited, in each container is converted into a video clip having a specified length, such as 4 seconds, that includes a transition, such as fade in from black at the beginning, and a fade out to black at the end. The fade ins and outs may be relatively rapid, such as a small fraction of a second. Effects may be added to the clip of each photograph such as a slow, slight zoom in (e.g. 90%) that ends up at one edge and then the photograph is panned across its width to the other edge, using a Ken Burns effect. A single video is built for each container containing at least one photograph or video or the minimum number of photographs and/or videos, if the minimum is different from one 224. Each video includes the clips in the order specified by the user, one after the other. The method continues at step 232.

The videos reside on a server to be downloaded to mobile devices, such as smart phones or tablets, for viewing. The photos or videos may be uploaded to a server before or after editing and converted to clips on the server or the clips may be produced on the smart device and uploaded to the server to produce the videos.

At any time, a user may supply characteristics that describe the user, profile information that may describe the user, such as whet the user likes or the user's interest, and characteristics of other users in which the user is interested 230. Such characteristics may include whether the user is male or female, and other conventional characteristics. Characteristics of other users in which the user is interested may include male or female users, and an age range with defaults being used if the user fails to specify them. The age range may be based on the user's age, and the user sex, as well as the sex of other users in which the user is interested. Profile information may include free form text regarding the user.

Periodically, location information such as GPS coordinates may be received from a device of the user that will be used to display videos of other users as described herein 232.

Each of several users supplies the information described above, and may then be shown the videos of other users in which the user may be interested as described herein. A trigger event for a user is received 234. A trigger event may be a user opening an application that operates as described herein, or may be a period of time elapsing since the user received videos for display, if the application has remained open or was last opened less than a threshold amount of time since the current time. Potential matches may be identified 236 by filtering all of the other users who have supplied some or all of information described above, and then scoring such other users who pass through the filters. As used herein "other users" are users who are not the user corresponding to the trigger event. Filtering may include excluding other users who were not interested in the user corresponding to the trigger event (e.g. the user who started the application) and other users in whom such user is not interested, based on the interests information of the user, interests information of the other users, and characteristics of the user and other users. In one embodiment, a user is not interested in an other user if the other user is of a sex in which the user is not interested, or of an age in which the user is not interested.

Filtering may include excluding other users based on the distance between the two users, as indicated by the last received location of each of the two users. A threshold distance may be employed so that an other user who exceeds a threshold distance to the user are excluded, with the threshold distance being increased if an insufficient number of other users pass through (i.e. are not excluded by) the filtering of step 236. Filtering may include excluding other users based on their activity regarding the actions described herein, such as by excluding other users who don't have a cover photograph, who don't have at least one photograph and/or video in the first container, who haven't logged in within a threshold amount of time such as four months, users who have been rejected by the user, other users with whom the user has communicated, other users who have been blocked by the user as described herein, other users who have blocked the user and other similar activity indicating that the other users are not a potential match. Filtering may include excluding other users based on activity from the social network, such as by excluding friends of the user on a social network. Filtering may include excluding the user as a potential match of himself or herself and/or excluding other users who had at the clip of the profile photograph already shown to the user.

The other users who were not excluded by the filtering in step 236 are scored 238. Newer other users, those under a threshold amount of time from the current time since they added their cover photograph or otherwise stopped being filtered from everyone else, receive an increased score for having that status. Other users who stop using the method to display videos of still other users for a threshold amount of time or deactivate their profile and then reactivate either their profile or use the method to view videos receive the same score increase as a new user or a lower score increase. Other users who receive indications from still other users who are not interested in such other user, with a percentage (of the total of interested and not interested) that is above a threshold (with the threshold optionally a function of sex and age of the user), receive a lower score than the remaining other users. Users who have not logged in since a threshold amount of time (e.g. 30 days) receive a lower score than the remaining other users. Other users with at least one mutual friend as the user receive a higher score than the remaining other users. The scores are sorted as part of step 238. The method continues at step 242 of FIG. 2B.

Pending matches to display are identified 242. In one embodiment, "pending matches" are those other users who have indicated an interest in the user corresponding to the trigger event, and "pending matches to display" are some or all of the pending matches. In one embodiment, the number of other users whose videos are to be displayed is limited, for example to 10 users per day (so that the 'limit' is 10). Limits may be applied to the time period, such as a day, though limits may be applied to a session, and a time period, so for example the first session of the day may have a limit of 10, where the second session of the day may have a limit that is ⅙ the number of hours since the last session, for example if the second session is six hours later, the limit for the second session is one. The number of pending matches to display may be a function of the limit applied to the session or time period. For example, the number of pending matches may be equal to 40% of the limit. For example, if the limit is 10, the number of pending matches is four. In one embodiment, the other users who become pending matches to display are randomly selected from among the pending matches, and in another embodiment, the highest scoring pending matches are selected to be pending matches for display.

In one embodiment, other users who are pending matches whoa are not selected as pending matches for display are treated as if they are not pending matches after they are not selected as pending matches for display, thus they will not be treated as pending matches again, for example, at the next trigger event or the next day. In one embodiment, this is only done with respect to pending matches of a user if the user has viewed other user's videos as described herein two or more days in a row. In another embodiment, pending matches not shown more than a threshold amount of time since they became pending matches are no longer treated as pending matches for the user. In another embodiment, all but a threshold number of the highest scoring pending matches are discarded using any such basis. In another embodiment, only pending matches below a certain score are discarded using any such basis. Such pending matches have their pending match status removed as part of step 242 once they are disqualified from being pending matches as described above An other user is selected from among the other users scored, subject to certain constraints 244. Constraints may include not selecting as the first user a pending match or one of the highest scoring users, instead selecting the user at random from among the users who are not the highest scoring users that will be selected if the user views the videos of the limit of other users. The clip of the primary photograph is displayed for the selected other user 246. Video from the first container for the selected other user is displayed in a loop, playing the video and over again until the user performs an action that stops the display as described herein, a user interface is provided, and a selection from the user interface is received 248. The user interface allows the user to make a selection indicating that the user is done watching videos, wishes to see more information about the user whose video is being displayed, is interested in the user whose video is being displayed, or is not interested in user's videos being displayed.

If the user selection indicates that the user wishes to see more information about the other user whose video is being displayed 250, the profile information of the other user whose video was being displayed, and any videos from other containers different from the container of the video that was being displayed are displayed to the user for selection, allowing the user to select one of such videos, a user interface is also displayed that allows the user to go back to viewing the video that was playing, to indicate that the user has an interest in the user whose video had been playing, or to indicate that the user does not have an interest in user whose video had been playing, and a user action is received.

If the user action indicates the user wishes to go back to viewing the video that has been playing 272, the method continues at step 248. If the user action indicates that the user wishes to select a video from a different container 272, the different container corresponding to the video the user indicates is selected 274, and the method continues at step 248 using the newly selected container. If the user indicates an interest in the other user's video being displayed 272, the method continues at step 252. If the user indicates the user is not interested in the other user whose video was being displayed 272, the method continues at step 252.

If at step 250, the user indicates that they are not interested in the other user whose video was being displayed, if the number of other users whose videos are were displayed during the day or session or other period is less than the limit of other users whose videos are to be displayed for such period 260, the video being displayed in a loop is stopped, a different other user is selected 260 from among the scored other users not already selected or pending matches for display not already selected, in this step or in step 244, subject to constraints. Constraints include selecting an other user from among those with the highest scores, if the number of users previously selected for the user in step 268 within the period in which the total number of users is computed is in a set of numbers (e.g. the set is 0, 2, 5 and 8), and selecting a pending match otherwise, or randomly selecting a scored other user (e.g. not necessarily one with a high score) if there are no more pending matches 268, and the method continues at step 246 using the newly selected user. Thus, the cover photo clip and the video from the first container will play immediately and without additional user input, once the user indicates interest or no interest in the other user whose video was playing.

If at step 250, the user indicates they are interested in the other user whose video was displayed, if the other user has not, or has not yet, expressed an interest in that user 252, the method continues at step 260. If the other user whose video is being shown expressed an interest in the user 252, the user and the other user are notified that the users have expressed a mutual interest in one another, communications between the two such users are enabled, additional information about each user from their profile information that had not been supplied as described above is optionally supplied, the video playing is stopped 254, and the method continues at step 260. In one embodiment, step 254 includes providing a user interface to the user to allow the user to indicate whether the user wishes to communicate with such other user or continue reviewing videos. If the user indicates they wish to communicate with such other user 256, the method continues at step 264 and otherwise 256, the method continues at step 260. The user may resume the method at step 260 or 264 at any time, via a user interface or by starting an app on a smart device such as a smart phone after step 234 has been performed but before the period of time to which the limit applies, has elapsed.

If at step 260, the number of other users whose videos were displayed in the period used to compute such number is equal to the limit, the user is notified that there are no more other users, or no more other users during such period 262, and the method continues at step 264.

At step 264, a user interface is provided to allow the user to communicate with either the user for whom communications were last enabled (if step 264 follows the no branch of step 256) provided such other user has not blocked the user or with any of the users with which communications have been enabled but have not been blocked. One of the pair of users may use a user interface to block communications with a user with which communications had been enabled, in which case communications between such users will no longer be enabled.

The two users with whom communication was enabled may send one or more messages, optionally for only a limited period of time. Following step 266, the users may move from being apart from one another to moving within proximity of one another, based on the messages, such may arrange such movement by one or both users.

There may be any number of users viewing any number of videos of any number of other users any number of times.

A system of elements with inputs and outputs and input/outputs may perform the method of the present invention, with elements passing information to perform the method as described herein. Communication interfaces of each of the user devices used to create the videos, a server used to create and store the videos and enable communications between devices of the user and other user for whom communications have been enabled, and the user devices of the users who view the videos allows communication between such devices.

Certain Embodiments.

Described is a method of building and displaying two or more videos of two or more other users to a user to allow the user to move into proximity with at least one of the other users, including:
for each of the two or more other users:
receiving two or more visual items including at least one digital photo and at least one digital video;
building an overall video including the visual items in response to editing instructions from the other user from which the visual items were received;
filtering the two or more other users to identify a subset, fewer than all but more than one, of the two or more other users based on at least one criteria received from the user;
computing a score for each of the other users in the subset of the two or more other users, each score computed as a function of a location and at least one characteristic of the user, a location and at least one characteristic said other user, a first amount of time said other user in the subset was eligible to be scored, a second amount of time said other user in the subset has been inactive as an other user, when said other user in the subset became active in using the method as an other user after a period of inactivity, and a percentage of selections made towards said other user in the subset by some of the other users in the plurality when such some of the other users viewed the overall video of said other user in the subset;
identifying a first number of other users in the subset that is substantially less than a second number of all of the other users in the subset, the first number being identified in response to a third amount of time the user last viewed at least one overall video of another user in the plurality before a start of a current session the user is using to view overall videos of at least one of the other users in the plurality;
sequentially displaying the overall videos of at least some of the other users in the subset for each of the first number of other users in the subset having the highest scores computed, with a user interface that allows the user to indicate whether he or she is interested in any other users whose overall videos are displayed; and
facilitating communications between at least one pair including the user and each of at least one other user in whom the user indicated such interest and from whom an indication of interest in the user was received, to cause the user and each such other user to move into proximity with one another.

Described is a computer program product including a nontransitory computer useable medium having computer readable program code embodied therein for building and displaying two or more videos of two or more other users to a user to allow the user to move into proximity with at least one of the other users, the computer program product including computer readable program code devices configured to cause a computer system to:
for each of the two or more other users:
receive two or more visual items including at least one digital photo and at least one digital video;
build an overall video including the visual items in response to editing instructions from the other user from which the visual items were received;
filter the two or more other users to identify a subset, fewer than all but more than one, of the two or more other users based on at least one criteria received from the user;
compute a score for each of the other users in the subset of the two or more other users, each score computed as a function of a location and at least one characteristic of the user, a location and at least one characteristic said other user, a first amount of time said other user in the subset was eligible to be scored, a second amount of time said other user in the subset has been inactive as an other user, when said other user in the subset became active in using the method as an other user after a period of inactivity, and a percentage of selections made towards said other user in the subset by some of the other users in the plurality when such some of the other users viewed the overall video of said other user in the subset;
identify a first number of other users in the subset that is substantially less than a second number of all of the other users in the subset, the first number being identified in response to a third amount of time the user last viewed at least one overall video of another user in the plurality before a start of a current session the user is using to view overall videos of at least one of the other users in the plurality;
sequentially display the overall videos of at least some of the other users in the subset for each of the first number of other users in the subset having the highest scores computed, with a user interface that allows the user to indicate whether he or she is interested in any other users whose overall videos are displayed; and
facilitate communications between at least one pair including the user and each of at least one other user in whom the user indicated such interest and from whom an indication of interest in the user was received, to cause the user and each such other user to move into proximity with one another.

What is claimed is:

1. A method of building and displaying a plurality of videos of other users to a user to allow the user to move into proximity with at least one of the other users, comprising:
for each of the plurality of other users:
receiving a plurality of visual items comprising at least one digital photo and at least one digital video;
building an overall video comprising at least a portion of each the plurality of visual items in response to editing instructions from the other user from which the visual items were received;
filtering the plurality of other users to identify a subset, fewer than all but more than one, of the plurality of other users based on at least one criteria received from the user;
computing a score for each of the other users in the subset of the plurality of other users, each score computed as a function of a location and at least one characteristic of the user, a location and at least one characteristic of said other user, a first amount of time said other user in the subset was eligible to be scored, and a percentage of selections made towards said other user in the subset by some of the other users in the plurality when such some of the other users viewed the overall video of said other user in the subset;
identifying a first number of other users in the subset that is substantially less than a second number of all of the other users in the subset, the first number being identified in response to a second amount of time the user last viewed at least one overall video of another user in the plurality before a start of a current session the user is using to view overall videos of at least one of the other users in the plurality;
sequentially displaying the overall videos of at least some of the other users in the subset for each of the first number of other users in the subset having a highest scores computed, with a user interface that allows the user to indicate whether he or she is interested in any other users whose overall videos are displayed; and facilitating communications between at least one pair comprising the user and each of at least one other user in whom the user indicated such interest and from whom an indication of interest in the user was received, to cause the user and each such other user to move into proximity with one another.

2. The method of claim 1, wherein the editing instructions comprise an order in which to display the plurality of visual items.

3. The method of claim 1, wherein the editing instructions include a start time and an end time of each digital video to be included in the overall video.

4. The method of claim 3, wherein a difference between the start time and the end time comprises a predetermined amount of time.

5. The method of claim 1, wherein the sequentially displaying is responsive to the user interface.

6. A computer program product comprising a nontransitory computer useable medium having computer readable program code embodied therein for building and displaying a plurality of videos of other users to a user to allow the user to move into proximity with at least one of the other users, the computer program product comprising computer readable program code devices configured to cause a computer system to:

for each of the plurality of other users:
receive a plurality of visual items comprising at least one digital photo and at least one digital video;
build an overall video comprising at least a portion of each the plurality of visual items in response to editing instructions from the other user from which the visual items were received;

filter the plurality of other users to identify a subset, fewer than all but more than one, of the plurality of other users based on at least one criteria received from the user;

compute a score for each of the other users in the subset of the plurality of other users, each score computed as a function of a location and at least one characteristic of the user, a location and at least one characteristic of said other user, a first amount of time said other user in the subset was eligible to be scored, and a percentage of selections made towards said other user in the subset by some of the other users in the plurality when such some of the other users viewed the overall video of said other user in the subset;

identify a first number of other users in the subset that is substantially less than a second number of all of the other users in the subset, the first number being identified in response to a second amount of time the user last viewed at least one overall video of another user in the plurality before a start of a current session the user is using to view overall videos of at least one of the other users in the plurality;

sequentially display the overall videos of at least some of the other users in the subset for each of the first number of other users in the subset having a highest scores computed, with a user interface that allows the user to indicate whether he or she is interested in any other users whose overall videos are displayed; and facilitate communications between at least one pair comprising the user and each of at least one other user in whom the user indicated such interest and from whom an indication of interest in the user was received, to cause the user and each such other user to move into proximity with one another.

7. The computer program product of claim 6, wherein the editing instructions comprise an order in which to display the plurality of visual items.

8. The computer program product of claim 6, wherein the editing instructions include a start time and an end time of each digital video to be included in the overall video.

9. The computer program product of claim 8, wherein a difference between the start time and the end time comprises a predetermined amount of time.

10. The computer program product of claim 6, wherein the computer readable program code devices configured to cause a computer system to sequentially display are responsive to the user interface.

* * * * *